US009510030B2

(12) United States Patent
Shaw et al.

(10) Patent No.: US 9,510,030 B2
(45) Date of Patent: Nov. 29, 2016

(54) DELIVERING MEDIA CONTENT TO A CONTENT CONSUMING USER

(71) Applicant: Piksel, Inc., Wilmington, DE (US)

(72) Inventors: Philip Antony Shaw, London (GB); Issar Amit Kanigsberg, Mill Valley, CA (US); Ralf Wilhelm Tillmann, Mannheim (DE); Andrew David Gayter, Buckinghamshire (GB)

(73) Assignee: Piksel, Inc., Wilmington, DE (US)

( * ) Notice: Subject to any disclaimer, the term of this patent is extended or adjusted under 35 U.S.C. 154(b) by 257 days.

(21) Appl. No.: 14/179,704

(22) Filed: Feb. 13, 2014

(65) Prior Publication Data

US 2015/0229975 A1 Aug. 13, 2015

(51) Int. Cl.
*G06F 3/00* (2006.01)
*H04N 7/173* (2011.01)
(Continued)

(52) U.S. Cl.
CPC ...... *H04N 21/23439* (2013.01); *G06F 3/0482* (2013.01); *G06F 17/30029* (2013.01); *G06F 17/30038* (2013.01); *G06F 17/30265* (2013.01);
(Continued)

(58) Field of Classification Search
CPC ........... G06K 15/402; G06K 9/00751; H04N 21/482; H04N 21/47202; H04N 1/00413; H04N 1/00408; H04N 21/4532; H04N 21/4755; H04N 21/44222; H04N 21/25435; H04N 21/23439; H04N 21/472; H04N 21/44008; H04N 21/2353; H04N 21/26233; H04N 21/44204; H04N 21/6587; H04N 21/8549; H04N 21/44218; H04N 21/251; H04N 21/25891; H04N 21/440281; G06F 3/0482; G06F 17/30386; G06F 17/30029; G06F 17/30038; G06F 17/30265; H04L 43/028; H04H 60/33; H04H 60/46; H04H 60/73
USPC .......................... 725/10, 12, 61, 87; 707/717
See application file for complete search history.

(56) References Cited

U.S. PATENT DOCUMENTS

2002/0111852 A1* 8/2002 Levine .................. G06Q 30/02
705/14.53
2003/0226151 A1 12/2003 Hamada et al.
(Continued)

FOREIGN PATENT DOCUMENTS

EP 1 804 510 A1 7/2007
GB 2 455 331 A 6/2009

OTHER PUBLICATIONS

Notification of Transmittal of The International Search Report and The Written Opinion of the International Searching Authority, or the Declaration, in re: International Application No. PCT/EP2015/053159; Date of Mailing: Apr. 14, 2015.
(Continued)

*Primary Examiner* — Hoang-Vu A Nguyen-Ba
(74) *Attorney, Agent, or Firm* — Hamilton Brook Smith & Reynolds, P.C.

(57) ABSTRACT

In the following, a content delivery system delivers a modified version of a media asset to a current content consuming user. Control information identifying a desired attribute of the modified version of the asset is received from the current content consuming user. The media asset is modified based on the control information and audience reaction data associated with the media asset and generated by analyzing at least a previous content consuming user's reactions to the media asset whilst the media asset was supplied to a media output device of the previous content consuming user.

28 Claims, 10 Drawing Sheets

(51) Int. Cl.

| | | |
|---|---|---|
| H04N 21/2343 | (2011.01) | |
| H04N 21/25 | (2011.01) | |
| H04N 21/258 | (2011.01) | |
| H04N 21/442 | (2011.01) | |
| G06K 15/00 | (2006.01) | |
| G06K 9/00 | (2006.01) | |
| H04N 21/482 | (2011.01) | |
| H04N 21/472 | (2011.01) | |
| H04N 1/00 | (2006.01) | |
| H04N 21/45 | (2011.01) | |
| H04N 21/475 | (2011.01) | |
| H04N 21/2543 | (2011.01) | |
| G06F 3/0482 | (2013.01) | |
| G06F 17/30 | (2006.01) | |
| H04L 12/26 | (2006.01) | |
| H04H 60/33 | (2008.01) | |
| H04H 60/46 | (2008.01) | |
| H04H 60/73 | (2008.01) | |
| H04N 21/235 | (2011.01) | |
| H04N 21/262 | (2011.01) | |
| H04N 21/6587 | (2011.01) | |
| H04N 21/8549 | (2011.01) | |
| H04N 21/44 | (2011.01) | |
| G06F 7/00 | (2006.01) | |
| H04N 21/4402 | (2011.01) | |

(52) U.S. Cl.
CPC ..... *G06F 17/30386* (2013.01); *G06K 9/00751* (2013.01); *G06K 15/402* (2013.01); *H04H 60/33* (2013.01); *H04H 60/46* (2013.01); *H04H 60/73* (2013.01); *H04L 43/028* (2013.01); *H04N 1/00408* (2013.01); *H04N 1/00413* (2013.01); *H04N 21/2353* (2013.01); *H04N 21/251* (2013.01); *H04N 21/25435* (2013.01); *H04N 21/25891* (2013.01); *H04N 21/26233* (2013.01); *H04N 21/44008* (2013.01); *H04N 21/44204* (2013.01); *H04N 21/44218* (2013.01); *H04N 21/44222* (2013.01); *H04N 21/4532* (2013.01); *H04N 21/472* (2013.01); *H04N 21/4755* (2013.01); *H04N 21/47202* (2013.01); *H04N 21/482* (2013.01); *H04N 21/6587* (2013.01); *H04N 21/8549* (2013.01); *H04N 21/440281* (2013.01)

(56) References Cited

U.S. PATENT DOCUMENTS

| | | |
|---|---|---|
| 2005/0038877 A1 | 2/2005 | Gupta et al. |
| 2008/0259209 A1* | 10/2008 | Houlgate ........... H04N 5/44591 348/461 |
| 2009/0037945 A1* | 2/2009 | Greig ...................... G09F 27/00 725/10 |
| 2010/0251295 A1 | 9/2010 | Amento et al. |

OTHER PUBLICATIONS

Notification of Transmittal of The International Search Report and The Written Opinion of the International Searching Authority, or the Declaration, in re: International Application No. PCT/EP2015/053156; Date of Mailing: Apr. 14, 2015.

* cited by examiner

DELIVERING MEDIA CONTENT TO A CONTENT CONSUMING USER

BACKGROUND

An ever-increasing quantity of media content is being produced that can be viewed by a content consuming user (content consumer) on a viewing device, such as a television ("TV") or similar. Moreover, a wide range of mechanisms are now available for delivering such content in addition to 'traditional' delivery mechanisms such as delivery via a broadcast channel to a television. These include on-demand delivery to computer devices such as smart-TVs, set-top boxes, smartphone or tablet devices, desktop computers, laptop computers etc. whereby a content consumer can stream media content (for online consumption) or download media content (for offline consumption) from a server over a network, such as the Internet or a cable TV network, at a time of their choosing. This includes recently broadcast content provided by a broadcaster of that content as part of a catch-up service, and historic or original (i.e. non-broadcast) content provided by a service provider as part of other on-demand services. On-demand services are accessed by a user using a user device on which is executed suitable software on such as a web-browser, media streaming or download application (or "app") e.g. provided by the broadcaster or service provider, or embedded software e.g. embedded in a set-top box provided by an operator of a cable TV network.

The proliferation not only of media content but also of the delivery mechanisms by which a user can opt to consume that content mean that, at any given time, there will likely be more media content available to a user which is at least of some interest to them than they can realistically hope to consume.

SUMMARY

The inventors have appreciated that there are a variety of situations in which a user, whilst having some interest in certain media content, is unable or unwilling to consume that content in its original form. An aim of the present invention is to modify such content within confines specified by the user whilst still retaining the inherent value that content had to the user in the first place.

According to a first aspect of the present disclosure, a content delivery system for delivering media content to a current content consuming user comprises: an input configured to receive from the current content consuming user selection information for selecting a media asset for delivery to a media output device of the current content consuming user and control information identifying a desired attribute of a modified version of the asset; computer storage configured to store the media asset and audience reaction data associated with the media asset and generated by analyzing at least a previous content consuming user's reactions to the media asset whilst the media asset was supplied to a media output device of the previous content consuming user; a modified version generation component configured to identify the selected media asset in the computer storage and modify the media asset based on the control information and the audience reaction data; and a content delivery component configured to supply the modified version of the media asset to the media output device of the current content consuming user, the modified version exhibiting the desired attribute.

As an example, the inventors have recognized there are a wide variety of situations in which a user is unable or unwilling to dedicate the time required to consume the entire asset in real-time. Here "real-time" content consumption means the entirety of that asset or content is played out over its full duration as intended by a creator of that content. For instance, wherever viewers consume long-form video content (be it TV shows, movies or online video etc.) there can often be a need to watch, catch-up, recap or review that content quicker than real-time. In each of these cases, expanded below, there's a video play activity with an overlaid time constraint.

In this case, the desired attribute may be a timing condition selected by the user, and the modified version of the selected content may be generated to have a duration which is limited that time condition.

In embodiments, said modification of the media asset by the modified version generator may comprise editing the media asset based on the audience reaction data to reduce the duration of the media asset. The desired attribute may be a timing constraint, and the media asset may be edited based on the timing constraint and the audience reaction data such that the modified version of the media asset has a duration limited by the timing constraint.

The edited version of the media asset may comprise at least one portion of the media asset identified as eliciting a higher level of audience interest by the audience reaction data and omit at least one portion of the media asset identified as eliciting a lower level of audience interest by the audience reaction data. The at least one portion identified as more interesting may have a respective duration determined by the modified version generation component based on the audience reaction data, that duration being a duration over which the higher level of audience interest is substantially sustained.

In embodiments, the content delivery system may further comprise a filtering component configured to receive current consumer profile information comprising personal data associated with the current content consuming user, and filter the audience reaction data based on the current consumer profile information, the modification of the media asset being based on the filtered audience reaction data.

The audience reaction data may comprise social data generated by analyzing one or more contributions uploaded by the previous content consuming user to a social networking service during a broadcast of the media asset to correlate at least one of those contributions to the media asset.

The audience reaction data may comprise attendance data generated by analyzing input signals received via an input component of the previous content consuming user's output device and instigated by the previous content consuming user to control the supply of the media asset to the previous content consuming user's output device.

The audience reaction data may comprise sensor data generated by analyzing data received from at least one sensor configured to record the content consuming user's reactions to the media asset whilst the media asset was supplied to the media output device of the previous content consuming user.

The selection information may be for selecting part of the media asset and the desired attribute is a desired attribute of a modified version of that part of the media asset, and the modified version generation component may be configured to modify the selected part of the media asset based on the control information and the audience reaction data, the modified version being a modified version of the selected part of the media asset.

The media asset may be a video asset. The output device of the current content consuming user may be a display screen.

The content delivery component may be a network interface configured to supply the modified version of the media asset to the media output device of the current content consuming user via a computer network. The modified version may be supplied as a stream or download via the network.

The modified version generation component may be configured to generate based on the control information and the audience reaction data media asset modification data and the modified version of the media asset is generated dynamically, based on the generated modification data, as it is supplied to the media output device of the current content consuming user. The modified version of the media asset may be generated dynamically responsive to one or more received modification requests, said requests having been instigated based on the generated modification data. Said requests may be instigated manually by the user. Alternatively, said requests may be instigated automatically in response to (that is, upon) reaching a point in the media asset identified as eliciting a lower level of audience interest by the audience reaction data to skip to a point in the media asset identified as eliciting a higher level of audience interest by the audience reaction data.

According to a second aspect of the present disclosure, a content delivery method for delivering media content to a current content consuming user comprises: receiving from the current content consuming user selection information for selecting a media asset for delivery to a media output device of the current content consuming user and control information identifying a desired attribute of a modified version of the asset; accessing computer storage to identify the selected media asset, the computer storage configured to store the media asset and audience reaction data associated with the media asset and generated by analyzing at least a previous content consuming user's reactions to the media asset whilst the media asset was supplied to a media output device of the previous content consuming user; modifying the media asset based on the control information and the audience reaction data; and supplying the modified version of the media asset to the media output device of the current content consuming user, the modified version exhibiting the desired attribute.

According to a third aspect of the present disclosure at least one computer readable medium stores executable program code configured, when executed, to cause operations of: receiving, from the current content consuming user, selection information for selecting a media asset for delivery to a media output device of the current content consuming user and control information identifying a desired attribute of a modified version of the asset; accessing computer storage to identify the selected media asset, the computer storage configured to store the media asset and audience reaction data associated with the media asset and generated by analyzing at least a previous content consuming user's reactions to the media asset whilst the media asset was supplied to a media output device of the previous content consuming user; modifying the media asset based on the control information and the audience reaction data; and supplying the modified version of the media asset to the media output device of the current content consuming user, the modified version exhibiting the desired attribute.

According to a fourth aspect, a computer device for delivering media content to a current content consuming user comprises: an input configured to receive from the current content consuming user selection information for selecting a media asset for delivery to a media output device of the current content consuming user and control information identifying a desired attribute of a modified version of the asset; an access component for accessing computer storage storing the media asset and audience reaction data associated with the media asset and generated by analyzing at least a previous content consuming user's reactions to the media asset whilst the media asset was supplied to a media output device of the previous content consuming user; a modified version generation component configured to identify the selected media asset in the computer storage and modify the media asset based on the control information and the audience reaction data; and a content delivery component configured to supply the modified version of the media asset to the media output device of the current content consuming user, the modified version exhibiting the desired attribute.

The computer device may be a user device or a server.

According to a fifth aspect, a content delivery system for delivering media content to a current content consuming user comprises: an input configured to receive selection information for selecting a media asset for delivery to a media output device of the current content consuming user; computer storage configured to store the media asset and audience reaction data associated with the media asset and generated by analyzing at least a previous content consuming user's reactions to the media asset whilst the media asset was supplied to a media output device of the previous content consuming user; a key moment identification component configured to identify from the audience reaction data that at least one portion of the selected media asset is a key moment; an extraction component configured to access the computer storage to identify the selected media asset and extract the identified portion of the media asset; and a content delivery component configured to supply the extracted portion of the media asset to the media output device of the current content consuming user.

The media asset may be extracted responsive to a user input from the current consuming user, or automatically.

The user input may be a skip request received during a current delivery of the media asset to the media output device of the current content consuming user by the content delivery component, responsive to which the content delivery component may be configured to skip the current delivery to the key moment of by supplying the extracted portion of the media asset to the media output device of the current content consuming user.

The skip request may instigated manually by the current content consumer.

Alternatively, the skip request may be instigated automatically responsive to the current delivery reaching a point in the media asset which is not a key moment.

The key moment identification component may be configured to identify that a plurality of portions of the media asset are key moments, and the extraction component is configured to selectively extract one or more of said portions. The user input may comprise a timing constraint and the extraction component may be configured to select the one or more portions based on the timing constraint and extract those selected portions.

According to a sixth aspect, there is disclosed a content delivery method for delivering media content stored in computer storage to a current content consuming user, the computer storage being further configured to store audience reaction data associated with the media asset and generated by analyzing at least a previous content consuming user's reactions to the media asset whilst the media asset was supplied to a media output device of the previous content consuming user, the method comprising: receiving selection information for selecting a media asset for delivery to a media output device of the current content consuming user; identifying from the audience reaction data that at least one portion of the selected media asset is a key moment; accessing the computer storage to identify the selected media asset; extracting the identified portion of the media asset; and supplying the extracted portion of the media asset to the media output device of the current content consuming user.

According to a seventh aspect, there is disclosed at least one computer readable medium storing executable program code configured, when executed, to implement a method for delivering media content stored in computer storage to a current content consuming user, the computer storage being further configured to store audience reaction data associated with the media asset and generated by analyzing at least a previous content consuming user's reactions to the media asset whilst the media asset was supplied to a media output device of the previous content consuming user, the method comprising: receiving selection information for selecting a media asset for delivery to a media output device of the current content consuming user; identifying from the audience reaction data that at least one portion of the selected media asset is a key moment; accessing the computer storage to identify the selected media asset; extracting the identified portion of the media asset; and supplying the extracted portion of the media asset to the media output device of the current content consuming user.

According to an eighth aspect, a computer device for delivering media content to a current content consuming user comprises: an input configured to receive selection information for selecting a media asset for delivery to a media output device of the current content consuming user; an access component for accessing computer storage configured to store the media asset and audience reaction data associated with the media asset and generated by analyzing at least a previous content consuming user's reactions to the media asset whilst the media asset was supplied to a media output device of the previous content consuming user; a key moment identification component configured to identify from the audience reaction data that at least one portion of the selected media asset is a key moment; an extraction component configured to access the computer storage to identify the selected media asset and extract the identified portion of the media asset; and a content delivery component configured to supply the extracted portion of the media asset to the media output device of the current content consuming user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

For a better understanding of the present invention and to show how the same may be carried into effect, reference will now be made by way of example only to the following drawings in which.

DETAILED DESCRIPTION

A description of example embodiments of the invention follows.

The teachings of all patents, published applications and references cited herein are incorporated by reference in their entirety.

Figure 1:
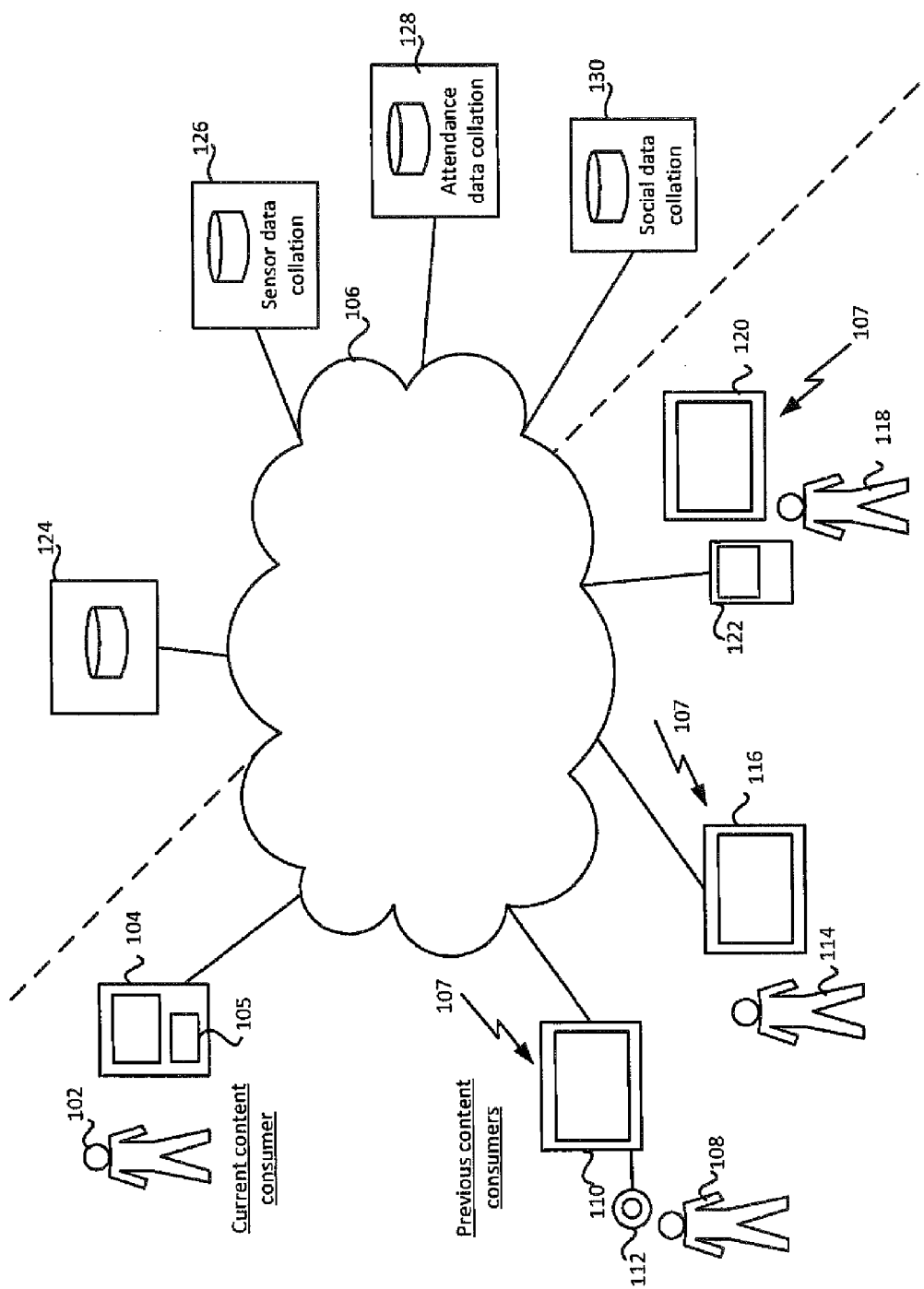
FIG. 1 is a schematic block diagram of various devices for use in delivering modified content to a user, and their associated users where applicable.

FIG. 1 shows a current content consuming user 102 (current content consumer) operating a first user device 104 capable of connecting to a computer network 106. The user device is a computer device in the form of, for example, a smartphone device, tablet computing device, personal computer ("PC"), smart-TV, set-top box, games console etc. The computer network is a packet-based network such as the Internet in this embodiment but may not be packet-based in other embodiments. The network connection can be wired such as Ethernet or wireless (either WiFi or GSM), or any suitable interface which allows the user device 102 to communicate with the network 106. Connected to the network 106 is a content providing server 124 which stores media content and associated data. The media content is stored in the form of a collection of media assets (that is, individual pieces of media content), each media asset being, for example, an episode of a television show, a movie, or a recording of a sports event (e.g. football match) etc.

The user device 104 executes a media application 105 which enables the user device 104 to communicate with the content providing server 124 via the network 106. Using the media application 105, the user 102 can select media content stored at the server 124 and the selected media content is supplied to the user device 104 via the network 106 for delivery to by the current content consumer 102 e.g. as a stream or download.

Figure 3:
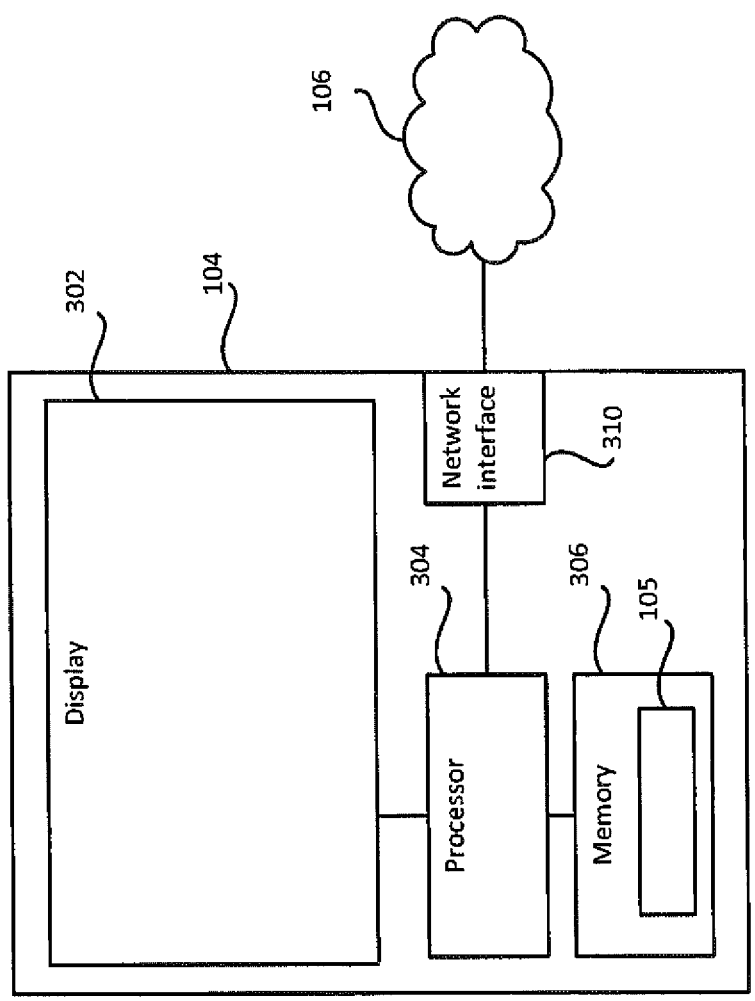
FIG. 3 is a schematic block diagram of a user device comprising a media output device in the form of a display.

Further details of the user device 124 are shown in FIG. 3 which is a schematic block diagram of the user device 124. As shown in FIG. 3, the user device 104 comprises a network interface 310 for connecting to the network 106, a processor 304 in the form of one or more Central Processing Units ("CPUs"), a memory (computer storage) 306, and a media output device in the form of a screen 302. The memory 306 is connected to the processor 304 and stores software in the form of program code for execution on the processor 304 which includes operating system code for managing hardware resources of the user device 104 and applications which cause the user device 104 to perform useful tasks above and beyond the mere running of the user device itself. The applications include the media application 308. The processor 304 is connected to the screen 302 to allow the screen to display media content and other information to the user 102. The processor is connected to the network interface 310 to allow data to be transmitted to and received from the network 106, which includes the receipt of media content for display on the screen 302 and the transmission of requests for such content. The screen is a touchscreen configured to also receive inputs from the user 102 and is thus also an input device of the user device 104. In alternative user devices the screen may not be a touch screen and/or the user device may comprise alternative input devices such as a keyboard, mouse, television remote control, camera or infra-red depth sensor able to detect gesture commands, biometric sensor(s) etc. The screen, network interface and memory are integrated into the user device 104. In alternative user devices, one or more of these components may not be integrated and may be connected to the processor via a suitable external interface (e.g. cabled interface such as USB or wireless interface such as Bluetooth or other wireless interface). For instance, the screen may be an external screen connected to the processor via a SCART, RCA or other similar interface.

The media application 105 has a user interface for presenting information to the user via one or more output devices of the user device 104 and to receive information from the user via one or more input devices of the user device 104. In particular, the user interface controls the display 302 to present visual information to the user 102.

Figure 2:
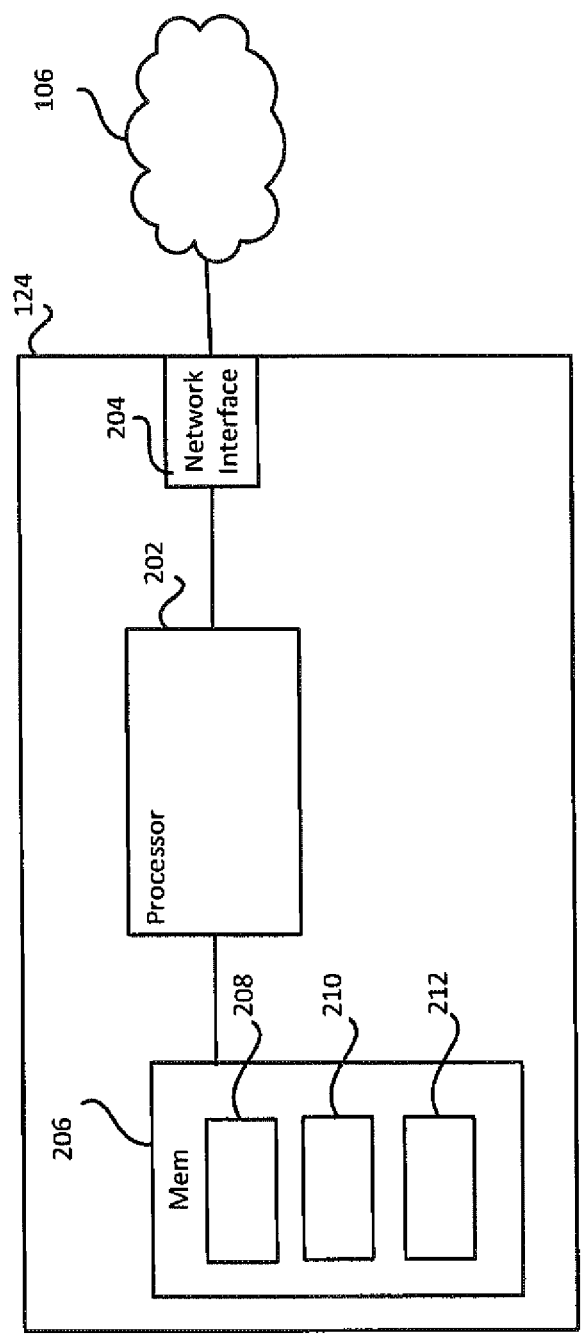
FIG. 2 is a schematic block diagram of a content providing server.

Further details of the content providing server are shown in FIG. 2 which is a block diagram of the server 124. The server 124 comprises a processor 202 in the form of one or more CPUs, a network interface 204, and computer storage 206. The computer storage 206 is connected to the processor 202 and holds both code for execution on the processor and data. The data includes one or more media assets 210 and respective audience reaction data 212 associated with those assets. The code includes content provider code 208 for providing media content of those media assets to users as requested thereby. The processor is connected to the network interface 204 to allow data to be transmitted to and received from the network 106 by the server 124. This includes receipt of requests for media content from the user device 104 and transmission of the requested media content to the user device 104.

Audience reaction data associated with a media asset is generated by analyzing at least a previous content consuming user's reactions to the media asset whilst the media asset was supplied to a media output device of the previous content consuming user. This is described in detail below.

Also connected to the network 106 are a sensor data server 126, an attendance data server 128, and a social data collection server 130. As explained in more detail below, the servers 126, 128 and 130 collect and collate various audience reaction data pertaining to one or more previous deliveries of the stored assets to one or more previous content consuming users (previous content consumers, referred to collectively as "an audience") and supply the collated audience reaction data to the content providing server 124.

An item of media content—equivalently referred to as a "media asset"—(or a series of such items), can be analyzed by monitoring audience reaction to it (them). This can take a number of forms:
  social commentary posted during a showing of the asset(s);
  biometric data collected during a showing of the asset(s);
  information about when users start and stop (or join and leave) showings of the asset(s).

The present disclosure primarily considers three types of audience reaction data, namely sensor data (in the form of biometric data), attendance data (equivalently referred to as audience size data) and social data, collated by servers 126, 128 and 130 respectively. However, other types of audience reaction data are envisaged and will be apparent upon consideration of the present teaching. Previously obtained audience reaction data associated with a media asset is then used to favorably adapt that media asset for the benefit of a current content consuming user.

FIG. 1 shows three previous content consuming users 108, 114 and 118 for the sake of illustration. As will be appreciated, there may be any number of previous content consuming users, likely significantly more than three. Each previous content consuming user 108, 114, 118 is shown in the vicinity of a respective viewing device 110, 116, 120 capable of receiving media content for delivery to those users. The viewing devices can take a variety of forms similar to user device 104.

The viewing device 110 is capable of connecting to the network 106 and is capable of receiving media content either via the network 106 or via a broadcast channel 107 (as a 'live' broadcast) and delivering that content to the user 108 via one or more suitable media output devices (display, loudspeakers) of the viewing device 110. The viewing device 110 collects sensor data from the user 108: the media device 110 is connected to biometric sensors 112 capable of providing sensor data for use in a biometric analysis to gauge the user 108's reactions to any content currently being delivered via the output device(s) of the viewing device 110. As the content delivery progresses, the sensors can track various user characteristics of user 108 as they respond thereto.

The sensors 112 of viewing device 110 comprise a heart-rate monitor (or similar) which tracks the user 108's heart rate at different points during delivery of the media content and a camera (or similar) which uses facial recognition techniques to ascertain when the user 108 is looking directly at the display of the viewing device 110 at different points during delivery of the media content. Sensor data from the sensors 112 is transmitted to the sensor data server 126 for collection thereby. For each media asset delivered to the user 108, the collected sensor data is indicative of the user 108's reaction to that media asset at different points in the media asset. Other, possibly many, viewing devices (not shown) operate in various ways to supply equivalent sensor data to the sensor data server 126 for the previous content consumers.

Alternative viewing devices which record sensor data may comprise one or more sensors for recording user characteristics, including biometric sensors of various types.

The sensor data server 126 operates as a collection agent for sensor data associated with various media content collected from sensors during delivery of the various content to various users. That is, the sensor data server receives sensor data associated with a media asset from multiple users (including 108) which it stores in association with an identifier of that media asset. Sensor data can be collected simultaneously by multiple viewing devices e.g. during a broadcast of the media asset (in which case the identifier could simply be a time, date and channel ID of the broadcast channel 107 on which the asset was broadcast) or it can be collected from multiple users by multiple viewing devices at different times e.g. when each of those users receives that media asset on-demand via the network 106 as a stream or download.

The viewing device 116 is capable of connecting to the network 106 and is capable of receiving media content via the broadcast channel 107 as a 'live' broadcast. The viewing device 116 collects audience reaction data for the user 114. During delivery of a media asset to the user 116 as a broadcast, the viewing device 116 monitors inputs received from the user 114 which relate to that delivery. That is, the viewing device 116 (which may, for instance, be a set-top box) records information identifying points during the broadcast at which the user 114 tunes in to the broadcast (that is, points at which the user 114 elects to consume the broadcast content) and tunes out (that is, points at which the user 114 elects not to consume the broadcast content despite its availability)—excluding advertisement breaks when present. The recorded information constitutes audience attendance data for the media asset, identifying whether or not the user was consuming that media asset at different points in the media asset. The viewing device 116 supplies the recorded information to the attendance data server 128. Other, possibly many, viewing devices (not shown) operate in various ways to supply audience reaction data to the audience reaction server 128.

Alternative viewing devices which collect audience reaction data, e.g. viewing devices running a catch-up or on-demand app, may be capable of receiving the media asset on-demand either as a stream or as a download. In this case, the catch-up or on-demand app can supply data to the attendance data server 128 over the network 106 e.g. identifying points within a media asset at which users of those devices e.g. skip content, stop streaming a media asset or stop watching a downloaded media asset etc. which is another form of audience reaction data.

Other viewing devices which collect audience reaction data can use audio-content-recognition to detect the start and end of playback of a media assert, and provide information about the detected start and end of playback to the attendance data server 128 which is yet another form of audience reaction data.

The attendance data collection server 128 operates as an attendance data collection agent for audience attendance data. That is, the audience reaction data server 128 receives audience reaction data associated with a media asset from multiple users (including 114) which it stores in association with an identifier of that media asset. Audience attendance data can be collected simultaneously by multiple viewing devices e.g. during a broadcast of the media asset (in which case the identifier could simply be a time, date and channel ID of the broadcast channel 107 on which the asset was broadcast) or it can be collected by multiple viewing devices at different times e.g. when each of those users receives that media asset on-demand via the network 106.

The viewing device 120 is capable of connecting to the network 106 and is capable of receiving media content via the broadcast channel 107 as a 'live' broadcast. The viewing device 120 is shown in the vicinity of a second user device 122 which is associated with the user 118. During delivery of a media asset received as a broadcast, the user 118 operates their user device 112 to input comments, observations and other information pertaining to the broadcast at different points as part of a public or semi-public social interaction with other users. This includes, for instance, uploading or "posting" comments via the network 106 to social networks (e.g. for display on a social network website to other users of the social network website) or interacting with such comments posted by other users consuming the same broadcast content.

Whilst devices 120 and 122 are separate, other users may post comments etc. to social networks and consume the broadcast content using the same device. For example, they may stream the live content as a broadcast stream substantially simultaneous with the broadcast over the broadcast channel 107 to a laptop over the network 106 and use that same laptop to upload comments via the network 106, or they may consume the broadcast content on a smart-TV capable of connecting to the network 106 and running a social networking app which they can use to upload such comments etc. whilst consuming the broadcast content.

Social networks are monitored during showings of each media asset and analyzed for posts that relate to the program by the social data server 130. Information about such posts is stored by the server 130 in association with an identifier of that media asset (which could, for instance, be a time, date and channel ID of the broadcast channel 107 on which the asset was broadcast). Various such analysis techniques are known in the art and are available 'off-the-shelf', and for those reasons the details thereof are omitted herein.

Once so collected, audience reaction data can be used, among other this, for the following:
- to determine which segments of media content are interesting to a particular users;
- to compare segments to one another in terms of relative appeal;
- to determine what a particular segment is about to decide whether or not a given clip is what a user wants.

The disclosure considers a process which automatically creates a particular digest of content—referred to as a "summarisation engine"—wherein each of the audience data sources above are considered as inputs to the process which allow the process to create a modified version of a media asset for subsequent viewers in the form of an edited version of that media asset.

A media asset can be edited to provide a compressed (i.e. reduced-duration and reduced-content) media asset or "summary" containing only those segments e.g. which are interesting to a particular user, only segments with the highest relative appeal, and/or only segments desired by a particular user.

Each contributor of social data (e.g. user 108), sensor data (e.g. user 114) and attendance data (e.g. 118) is profiled by looking at their previous contributions and/or personal data to allow them to be categories into user groupings. Social graphs, where available are particularly valuable for this, but also past biometric/audience contributions to similar pieces of content also allow a detailed picture of each user's preferences to be built up. When a current content consuming user expresses an interest in a media asset at a later date, the historic audience data can be filtered based on this profiling to include only audience data collected from previous content consumers who are expected to have similar preferences to the current content consuming user. The media asset is then edited based on the filtered audience data so that the edit only takes information expected to be relevant to the current content consuming user, thereby providing a summary of the media asset which is bespoke to that user.

The edited version of the media asset comprises one or more portions of the media asset identified as more interesting by the audience reaction data and does not comprise (i.e. omits) one or more portions of the media asset identified as less interesting by the audience reaction data.

A method of delivering content to a current content consuming user will now be described with reference to FIGS. 4 and 5. In embodiments, the method is implemented at the content delivery server 124 and FIG. 4 is a functional block diagram of a part of the server 124

Figure 4:
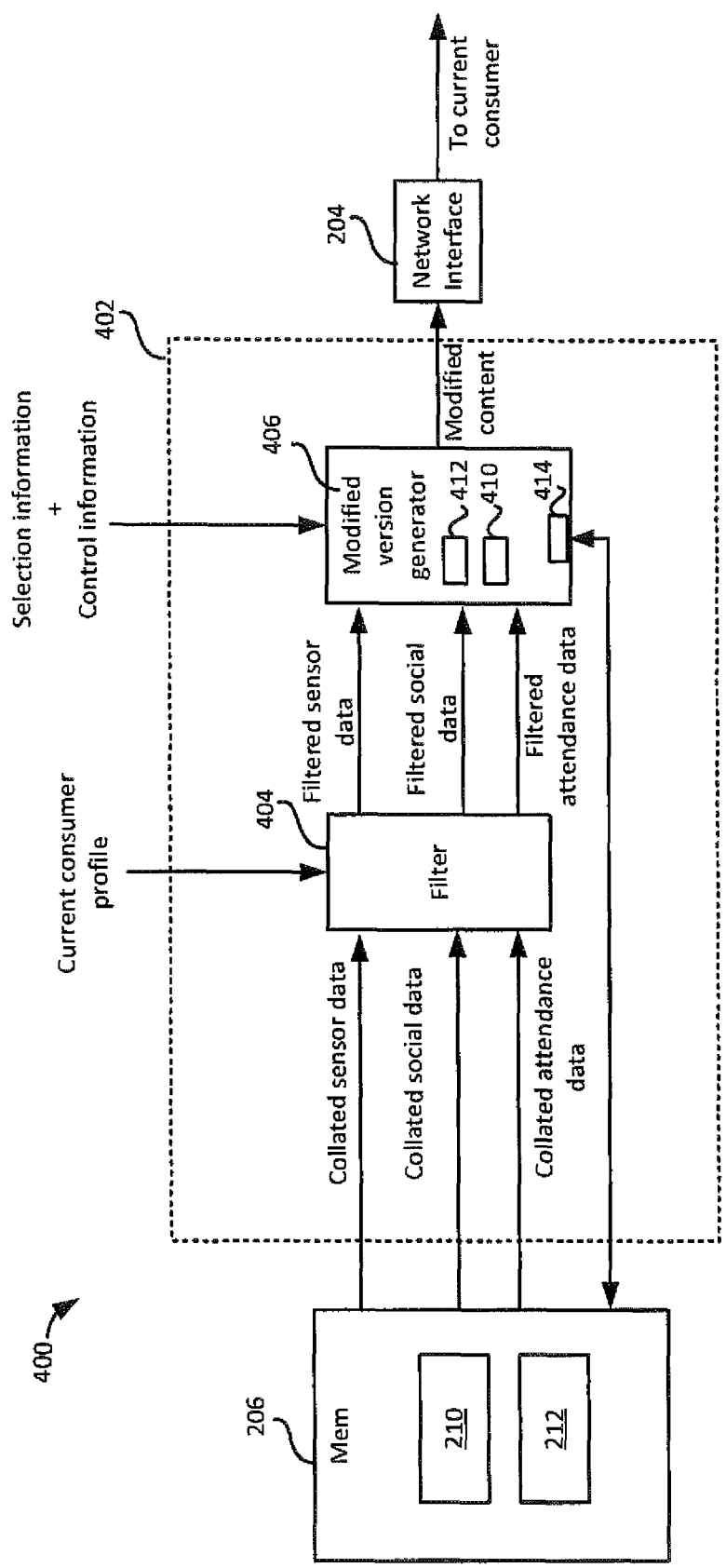
FIG. 4 is a functional block diagram of a content delivery system.
Figure 5:
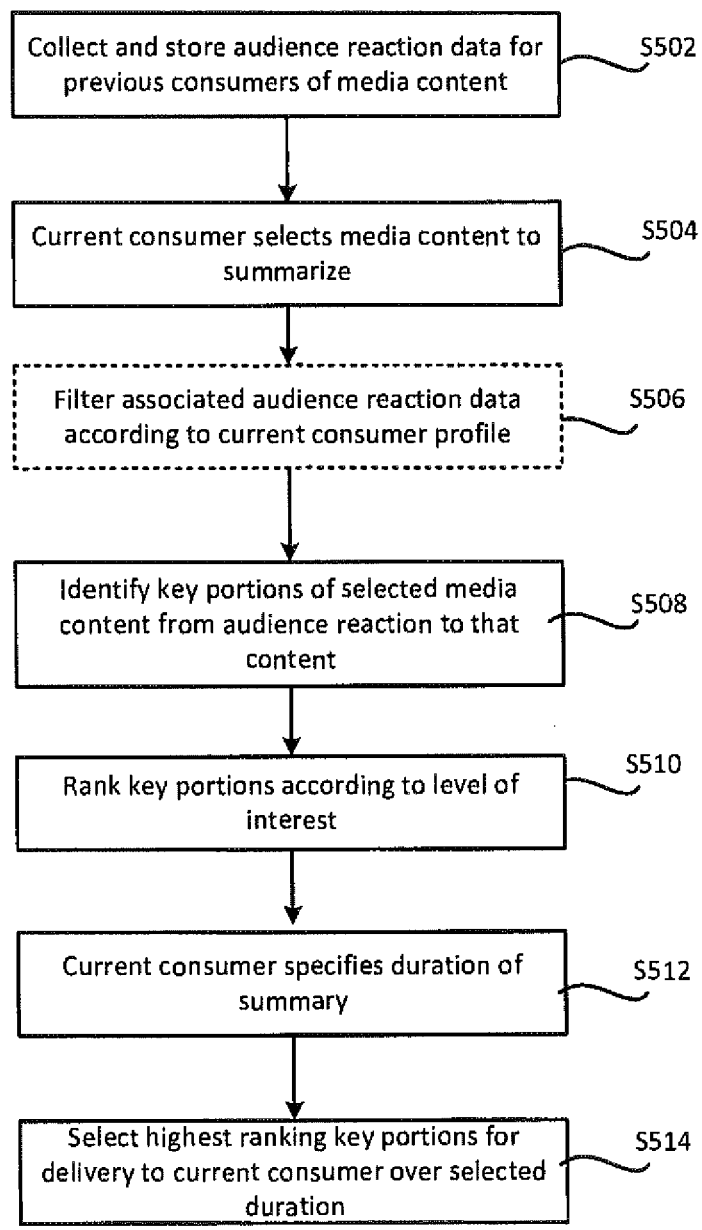
FIG. 5A is a flow chart for a content delivery method according to a first embodiment.
Figure 5B is a flow chart for a content delivery method according to a second embodiment.

FIG. 4 shows a content delivery system 400 for delivering modified content to a current content consumer. The system 400 is implemented by the content providing server 124 and comprises a modification component 402 implementing the summarization engine. The component 402 represents the functionality implemented by executing the content provider code 208 on the processor 202 of the server 124. As shown in FIG. 4, the content delivery system 400 comprises the computer storage 206, the network interface 204 and the modification component 402. The modification component 402 comprises a filtering component 404 and a modified version generation component 406. The modified version generation component 406 has first, second and third inputs connected to first, second and third outputs of the filtering component 404 respectively, a fourth input connected to receive control information and selection information, and a fifth input connected to receive media content in the form of media data from the computer storage 206. The modified version generation component 406 also has a first output connected to supply selection information to the computer storage 206 and a second output connected to supply media content in the form of media data to the network interface 204. The filtering component has first, second and third inputs connected respectively to receive different types of audience reaction data associated with one or more selected assets (or parts thereof) from the computer storage 206, namely collated sensor data, collated social data and collated attendance data. The filtering component also has a fourth input connected to receive current consumer profile information.

The selection information identifies one or more selected media assets (or parts thereof) selected by the current content consumer 102. The control information identifies a desired attribute (that is, desired by the current content consuming user) of a modified version of the identified one or more media assets (or parts thereof), for instance a timing constraint. The profile information comprises personal data associated with the current content consuming user, such as historic media consumption information identifying media content they have previously consumed and possibly an indication of whether or not they reacted favorably to that content, and demographic information such as gender, age, ethnicity, location etc.

The filtering component 404 receives user profile information comprising personal data associated with the current content consuming user 102, and filters the audience reaction data (sensor, social, and attendance data) for the selected media asset(s) (or parts thereof) based on the user profile information to include selective audience reaction data from only selective previous content consumers expected to have similar tastes and preferences to the current content consumer 102 (e.g. those in the same demographic group and/or those who have consumed and enjoyed similar content to that consumed and enjoyed in the past by the current content consumer 102).

The modified version generation component 406 generates the modified version of the selected media asset(s) (or parts thereof) based in the filtered audience reaction data and the control information. The modified version is generated not only to exhibit the desired attribute but also in a manner that does not detract from those parts of the media asset expected to elicit the most favorable reactions from the current content consumer 102, those parts being the parts that elicited the most favorable reactions from the selective previous content consumers. That is, it is assumed that the current content consumer will react to those parts in a similar manner to the selective previous content consuming users.

The modified version generation component comprises an access component 414 for accessing the computer storage 206, a key moment identification component 410 for identifying one or more key moments of the media asset (described below), and an extraction component 412 for extracting portions of the media asset at those key moments (described below).

The disclosure considers the following scenarios in which it would be beneficial to modify an asset to generate a modified version of that asset, in particular a compressed asset having a duration limited by a user-specified time-constraint.

1. Impatient Viewer

People do not always have time to watch the full movie, episode of their favorite TV show or the latest football match. These viewers want to see the edited highlights of their content in the time available. While this could be solved by the content owner creating a custom clip reel for each piece of content this rigid approach suffers in that:

- it does not address the needs of different sets of users who may want to condense content into different time spans (Ben has 10 mins to watch the best bits of a movie; Joe has 30 mins etc . . . )
- not all viewers find the same bits of content interesting. One group of users may be more into the results of a talent show while others prefer the acts.
- the staffing overhead involved in creating condensed content manually, particularly if you own a large catalogue of media, can be significant.

In this instance, the problem is one of compressing a media asset (such as a film, episode, or recording of a sports event) into a given timeframe for a particular viewer given their tastes and/or preferences without significant editorial effort. That is, contextual auto zeitgeist.

2. Catch-Up

Viewers hear about a great new TV show that everyone is talking about but they've missed the first few episodes and the next one is on soon. It would be desirable for them to be able to catch up with the story lines so they can start watching the next episode the moment it's shown. Currently, such users may simply avoid watching any subsequent episodes until the whole thing is released on catch-up by which time they've either forgotten about it or gone off the idea.

Here there is a similar time constraint as #1 above as well as the need to create a digest of content for easy, quick consumption. A difference here is the content may be content be content of a plurality of media assets e.g. if it spans more than one episode of a TV series.

3. Recap

The viewer may have started to watch a movie or a season of TV shows but for some reason took a break. For example, they're now about to start watching the season on-demand from where they left off but they want to remind themselves about what had happened up to that point, or they're resuming the movie but can't quite recall what the highlights were.

In this case, the viewer wants a quick way to recap the content they already watched to get them ready to pick the show, movie or game back up again. There's a similar time constraint; a potential need to condense multiple and indeed partial media assets; and benefit derived from a personalized set of highlights.

Figure 5A:
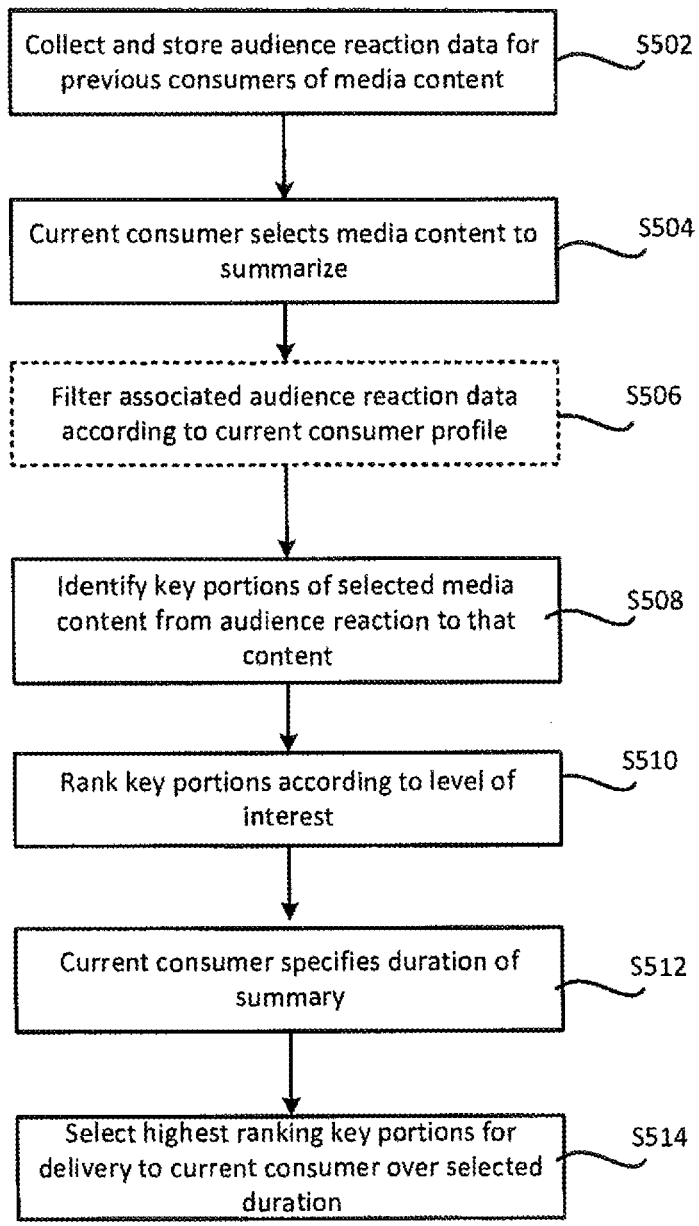

The method according to a first embodiment will now be described with reference to FIG. 5A, which is a flow chart for the method. In the method of FIG. 5A, the desired attribute is a timing constraint and a summary of selected media content is generated comprising only selective portions of that media content (other portions of the media content are omitted form the summary). Those selective portions are the portions assumed to be most interesting to the current content consumer compared with other portions of the media content. This assumption is based on the fact that audience reaction data associated with that media content and collected from selective previous content consumers, expected to have similar tastes and preferences to the current content consumer, indicates that those selected portions were most interesting to those previous content consumers compared with other portions of the media content.

At step S502, audience reaction data (sensor data, social data and attendance data) for at least one (possibly partial) media assets is collected and for multiple previous content consuming users by monitoring and recording their reactions whilst that asset is delivered via output devices of those users. The audience reaction data is collated by servers 126, 128 and 130 and, once so collated, is supplied to the content providing server 124 where it is stored in association with the respective media asset to which it relates.

Figure 7A:
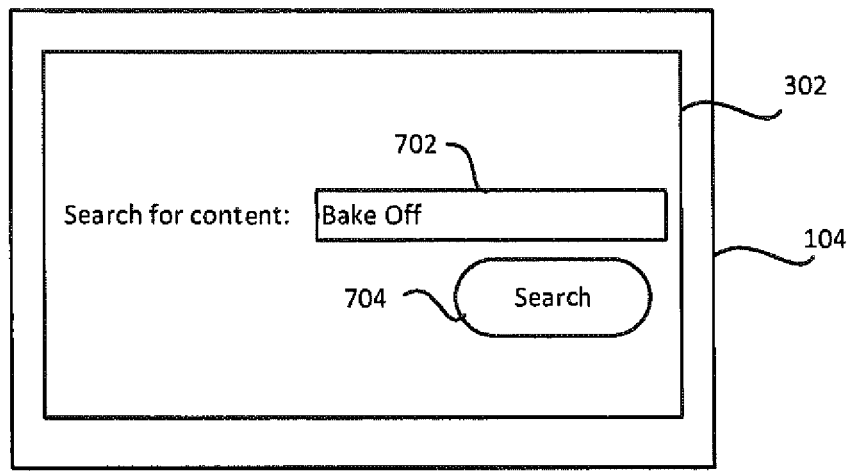
FIG. 7A is an exemplary illustration of an application user interface operating in a search mode.
Figure 7B:
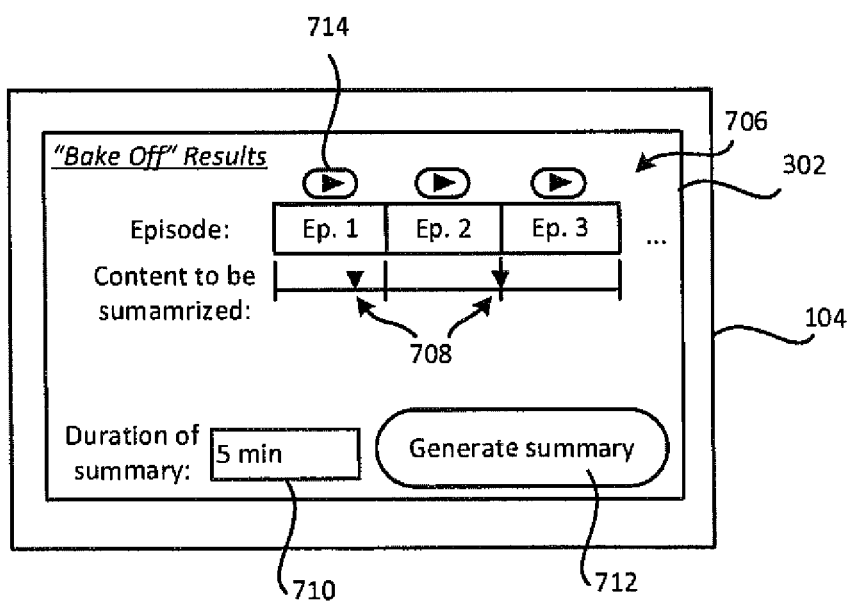
FIG. 7B is an exemplary illustration of a an application user interface operating in a selection mode.

At step S504, the media application 105 presents, via the user interface, one or more selection options for the user 102 to select media content (one or more assets, or parts thereof) that they wish to summarize. An example is illustrated in FIG. 7A. In this example, the application 105 presents via the application user interface a search field 702 into which the current content consuming user can input one or more search terms e.g. using the touch screen or voice recognition. Responsive to the current content consuming user selecting a search option 704, the input search terms are transmitted to the server 124 where they are processed to determine whether or not there are any media assets stored in memory 206 that match those search terms. For instance, the user 102 may enter one or more words which they believe to constitute a title of a movie or television show which are processed by the server 124 to see if that movie or television show is stored in memory 206. The sever 124 notifies the user device 104 if one or more matching media assets are found, responsive to which the media application 105 presents via the user interface one or more selectable options by which the current content consuming user can select some or all of the matching content (that is, some or all of the matching assets, or parts thereof) that they wish to summarize. An example is illustrated in FIG. 7B. In this example, the user's search has returned a plurality of episodes of a television show (each episode being stored as a respective media asset at the server 124). The user 102 can select which parts of the episode(s) they wish to summarize in this example by moving sliders 708 to encompass different temporal parts of the content—for instance, in FIG. 7B, the user has selected all of episode 2 and approximately one quarter of episode 1 to be summarized (to indicate that only portions of the media assets from those parts are to be included in the summary). This selection is transmitted to the server 124 responsive to the user selecting a summarization option 712 and received thereby as the control information of FIG. 3 In response, the modified version generator 406 identifies the selected media content in the memory 206 and retrieves it therefrom.

The application also presents a duration field into which the user 102 can input a desired duration for the summary (see below).

At step S506, the audience reaction associated with that media content is optionally supplied to the filtering component 404 for filtering, as explained in more detail below. At step S508, the (possibly filtered) audience reaction data associated with the selected media content is processed to identify "key portions" of that media content. Here, "key portions" mean those portions of the media asset which the (possibly filtered) corresponding audience reaction data indicates were of most interest to (that is elicited the most favorable reactions from) the audience of previous content consumers to which that (possibly filtered) audience reaction data pertains.

For each previous content consumer, the audience reaction data associated with a media asset tracks how that previous content consumer reacted to that media asset at different (temporal) points within that asset. That is, the timing of the audience reaction data correlates with that of the media asset in that the audience reaction data identifies how the previous content consumer reacted to the media asset at different points relative to a reference point of the media asset (e.g. at different times relative to the start or end of the media asset).

This is described for each of the different audience data-sets below.

1. Social Data

Looking at the full set of social updates posted about a media asset during a showing, it is possible to discern groupings of comments at certain points in the media content. It is assumed that this indicates that something interesting has happened at each of these points.

Figure 6:
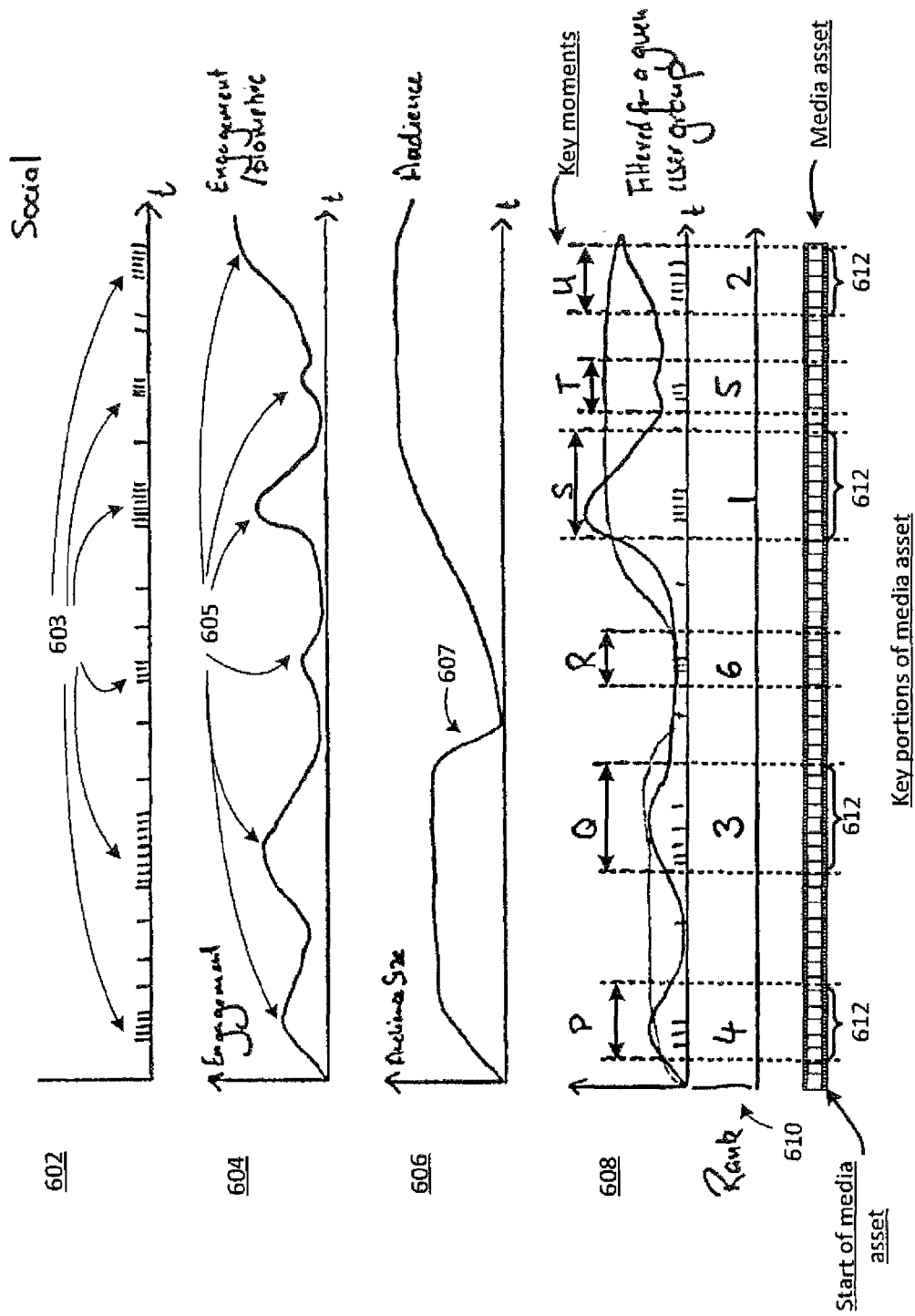
FIG. 6 shows exemplary graphical representations of various types of audience reaction data.

Graph 602 in FIG. 6 shows an example of one such timeline for the selected media content. Here, it can be seen that there are six key moments—labeled as 603—within this media asset.

However, the clustering of social updates is only one part of the value that can be extracted. An analysis of each contributing (i.e. previous content consuming) user's full social profile allows previous content consuming users to be collected together into demographic groups. The current content consumers own profile information is the used to assign the current content consuming user to one of those groups, and the social data is filtered to include only audience reaction data collected from previous content consuming users in that group. There are standard techniques for grouping users in this way, known to those skilled in the art.

So, for example, for a male viewer aged 23 wishing to see a summary of an action movie, only those social updates from men aged 18-25 who also frequently watch similar movies might be included. This would give a very different view of what was interesting in the content than if reactions from, say, women aged 45-50 were considered.

With each successive showing of the content (e.g. with each public broadcast), the timeline of social updates can be added to in order to build up a progressively more detailed picture of audience responses to the content. As such, identifying interesting moments can be done with increasing accuracy as more and more social data is collected at different times.

2. Biometric (Sensor) Data

Viewers whose playback devices include biometric sensors contribute a further useful dataset to the summarisation engine. Tracking this data (e.g. heart rate or the amount of time the viewer is looking at the screen during the showing) allows an engagement chart—as illustrated in graph 604 of FIG. 6—to be created.

Increased heart rate during a period of active engagement with the content indicates the possibility of an engaging moment in the content; lower heart rate suggests a less engaging moment. Similarly, a user looking directly at the screen indicates possible concentration during an engaging moment of the content; the user looking away from the screen indicates possible distractions during a less engaging moment.

By combining such data from a number of users it is possible to chart an overall engagement graph 604 for the selected media content.

The Summarisation Engine's approach to selecting potentially interesting points using this data is similar to that used with social commentary: by identifying marked peaks in interest it is possible to identify moments of interest. Examples of such peaks are labeled as 605 in FIG. 6.

As with social data, the summarisation engine can draw on data from similar users (previous consumers in the same group as the current consumer), rather than the global dataset, when looking for moments of interest to particular users. That is, sensor data can be filtered to include only sensor data collected from previous content consumers considered to be most similar to the current content consuming user.

As with social data above, this chart 604 can be made more detailed by adding data collected from successive showings of the content. Individual anomalies are therefore smoothed out as the number of contributors to this dataset increases.

3. Audience Attendance

The audience attendance dataset is primarily useful when detailed biometric data is not available and measures the points at which viewers actively tune into and turn off from watching an item of content—excluding ad breaks.

By collating attendance data from multiple previous consumers of the content, the size of the audience over time can be tracked. Where people turn off from the program, this suggests a moment which negatively affects engagement. Where enough people do the same (e.g. as at 607 in FIG. 6), it can be assumed with sufficient confidence that this is such a moment. The attendance data can also be filtered to include only that from previous consumers in the same group as the current consumer.

Again, the audience attendance dataset can be added to with each subsequent showing of the content. As the number of contributors to the dataset increases, those moments that have the largest audiences are considered the most interesting to the audience.

Graph 606 in FIG. 6 shows an exemplary view of attendance data for the selected media content.

The summarisation engine looks at the widest range of data available to it from the three sources detailed above. For each viewer asking for a summary, their individual profile is optionally used to match them against other audience members to ensure that the most appropriate moments are selected.

The three data sets collectively identify an overall level of audience interest at different temporal points within the media asset with which they are each associated e.g. due to the size of the audience at those points (from the attendance data), the frequency of social media posts at those points (from the social data), and the measured level of audience engagement at those points (from the sensor data). This is illustrated in graph 608 of FIG. 6.

In embodiments, the different types of audience reaction data (social, sensor/biometric, attendance) are not given equal consideration, but rather are hierarchically ranked on the basis that some are expected to provide more useful or comprehensive information than others. Biometric data carries greatest weight when being considered by the summarisation engine because it measures engagement most directly. Social data is ranked below biometric data, but above audience attendance because it demonstrates engagement with the content but requires an action by the viewer whereas biometric requires the viewer to expend no additional effort to provide the data. Audience attendance data carries least weight when being considered by the Summarisation Engine because it is only a passive measure of engagement.

Graph 608 in FIG. 6 shows the three audience reaction data sets, filtered for a particular user group (that of the current content consuming user 102). The Summarisation Engine (that is, the key moment identification component 410) is able pick out six key moments (P, Q, R, S, T, U), which may be of different durations, from the audience reaction data associated with the selected content that are likely to be of interest to the current content consuming user on the basis that they were of interest to (possibly a selective group of) the previous content consumers. Given the decay in interest for each about the respective peaks, it is possible to estimate the length of each key moment as illustrated by the vertical dotted lines superimposed on graph 608. Each key moment is a time interval having a start and end time relative to a reference point in the media asset (e.g. relative to the start or end of the media asset) selected by the summarization engine to encompasses a peak (local maximum) in the overall interest level and to have a duration over which that peak level is substantially sustained.

The remaining time intervals (that is, intervals intervening the key moments) are considered not to be key moments.

Alternatively, the audience reaction data could be divided into, say, time intervals of equal length or time intervals corresponding to individual respective scenes of the corresponding media content etc. For each of those intervals, the summarization engine then determines whether or not that interval is a key moment from the respective part of the audience reaction data collected over that interval.

At step S510, the identified portions are ranked according to the overall level of interest they inspired in the (possibly selective) audience of previous content consuming users as a whole. That is, the strength of interest in each key moment can be assessed from the respective part of the audience reaction data corresponding to that key moment (i.e. the respective part that was collected at that key moment during one more previous deliveries of the media asset), either for the entire audience or just those in the group to which the current content consumer also belongs. The overlaid charts in graph 608 of FIG. 6 are filtered for a particular user-group, and each clip is ranked according to how strongly it evoked a response from that group.

The rankings for the key moments P-U are labeled as 610 in FIG. 6. Key moments for which there are more social media posts per minute (higher frequency) and/or higher peak levels of engagement indicated by the sensor data and/or larger audiences are ranked higher than key moments for which there are fewer social media posts per minute (lower frequency) and/or lower peak levels of engagement indicated by the sensor data and/or smaller audiences.

At step S512 the current consumer specifies a time constraint for (that is a desired duration of) the summary. To this end, the media application 105 presents via the user interface one or more selectable summarization options. In the example of FIG. 7B, the application presents the summarization field into which the user can input the desired duration of the summary, which is transmitted to the server 124 responsive to the user 102 selection the summarization option 712 along with the user's selection. This is supplied to the summary engine as the control information shown in FIG. 4.

Duration and interest level are then used by the summarisation engine to create a summary tailored to a specific user's needs at step S514. At step S514, the modified version generator selects key moments in order of rank until the cumulative duration of the selected key moments substantially matches the desired summary duration.

As an example, the current content consumer may wish to summarize this piece of content in 5 minutes and specify that duration to the summarization engine. In the example of FIG. 6, the summarisation engine has identified six key moments with a total duration of 8 minutes. Since there is not enough time to show them all, the engine picks the highest ranking moments first until the addition of a further clip would exceed the user's requirement. In this example, the key moments P, Q, S & U are selected in accordance with that criterion.

The summary (modified asset) is generated by concatenating key portions 612 of the media asset identified by the selected key moments. Each key portion 612 of the media asset is a respective portion of the media asset occurring at a respective corresponding selected key moment (i.e. each key portion is the respective portion of the media asset between the determined start and end times of the respective corresponding identified key moment relative to the reference point in the media asset e.g. the start of the media asset). Each is extracted from the media asset by the extraction component 412.

The key portions are concatenated in the temporal order in which the occur in the original media content e.g. so that, when the summary is played out, clip P, then clip Q, then clip S, then clip U is played. The summary is delivered to the user device 104 either by streaming the summary thereto or by the user device 104 downloading the summary from the server 124 for offline consumption.

The summarisation engine can thus create a generic edit using all social data (if no filtering is applied) or personalized edit of content just those updates from previous content consumers similar to the current content consumer.

Note that references to "modifying an asset", to "generating a modified asset" and the like do not necessarily imply that media data separate from the media data of the original asset is generated and e.g. stored in memory alongside the original media asset.

A modified version of a media asset can be created by generating media asset modification (meta)data in the form of a "skip track" which identifies, for instance, those portions of the media asset which should be skipped when the modified version thereof is delivered—e.g. to generate the summary containing key moments P, Q, S and U, the modification can be effected by generating metadata which specified that delivery of the selected content as a stream to the user 102 via the network 106 should commence at the start of P, skip to Q at the end of P (omitting intervening portions), skip to S at the end of Q (omitting intervening portions), skip to U at the end of S (omitting intervening portions), and terminate at the end of U. That is, the modified version of the media asset may be generated 'on-the-fly' (dynamically) as the media asset is, say, streamed to the current consumer over the network 106 by skipping delivery at the end of each key moment to the start of the next key moment identified by the skip track.

This is advantageous in many scenarios as it requires only minimal memory overhead to generate each modified version of the selected content (whereas significant memory overheads would be required to generate and store possibly numerous partial replicas of the original media content).

In embodiments, the skip track is transmitted to the user device 104 over the network 106 for use thereat. For instance, responsive to a download input from the current consumer, the application at the user device may download both the full, unmodified media asset and the skip track from the media server 124, and the downloaded media asset may then be delivered at the user device in dependence on the skip track and possibly based on a user input timing constraint in the manner described above e.g. to only deliver key portions of the media asset as identified by the skip track to the current consumer and/or only those key portions that have an overall duration less than that specified by the current consumer at the user device. For instance, the modified version may be generated and stored at the user device based on the unmodified version and the skip track as a separate media file, or the downloaded media asset may be modified 'on-the-fly' as the downloaded media asset is delivered (played-out) in order to deliver the modified version to the current consumer at the user device. That is, the application running on the user device may modify a media asset stored at the user device based on the control information received at the user device and the audience reaction data (e.g. using the skip track stored at the user device).

As another example, the media asset may be streamed to the user device and the application 105 on the user device (or possibly a plugin to that application) may automatically instigate one or more modification requests in the form of skip request(s) to the server 124 over the network 106 based on the received skip track, responsive to which the media asset stream skips to the next key moment, relative to a current elapsed time of the stream, identified by the skip track in order to modify the asset, again, 'on-the-fly'. For instance, a skip request may be instigated automatically responsive to the application (or plugin) determining the stream has reached a point in the media asset which is not a key moment (that is a temporal point outside of a temporal interval identified as a key moment) in order to skip to the next key moment. These skip requests may be instigated in further dependence on the input timing constraint from the current content consuming user e.g. skip requests may be instigated in order to effect a delivery of only those key portions having a cumulative duration less than that desired by the user—for instance, to effect delivery only of portions P, Q, S and U, a first skip request effecting a skip to the start of P may be instigated, a second skip request may be instigated at the end of P to skip to the start of Q etc. until the end of U at which point a termination request may be instigated to terminate the delivery. Thus, the skip requests may be automatically instigated responsive to the stream reaching a point which is not a selected key moment (but which may or may not be a non-selected key moment).

Alternatively these skip requests may be instigated manually but in nonetheless in response to information and/or selectable options presented to the user via the user interface based on the received skip track (see below). That is, the modification may be effected at the user terminal and possibly the behest of the current content consuming user thereof.

Figure 5B:
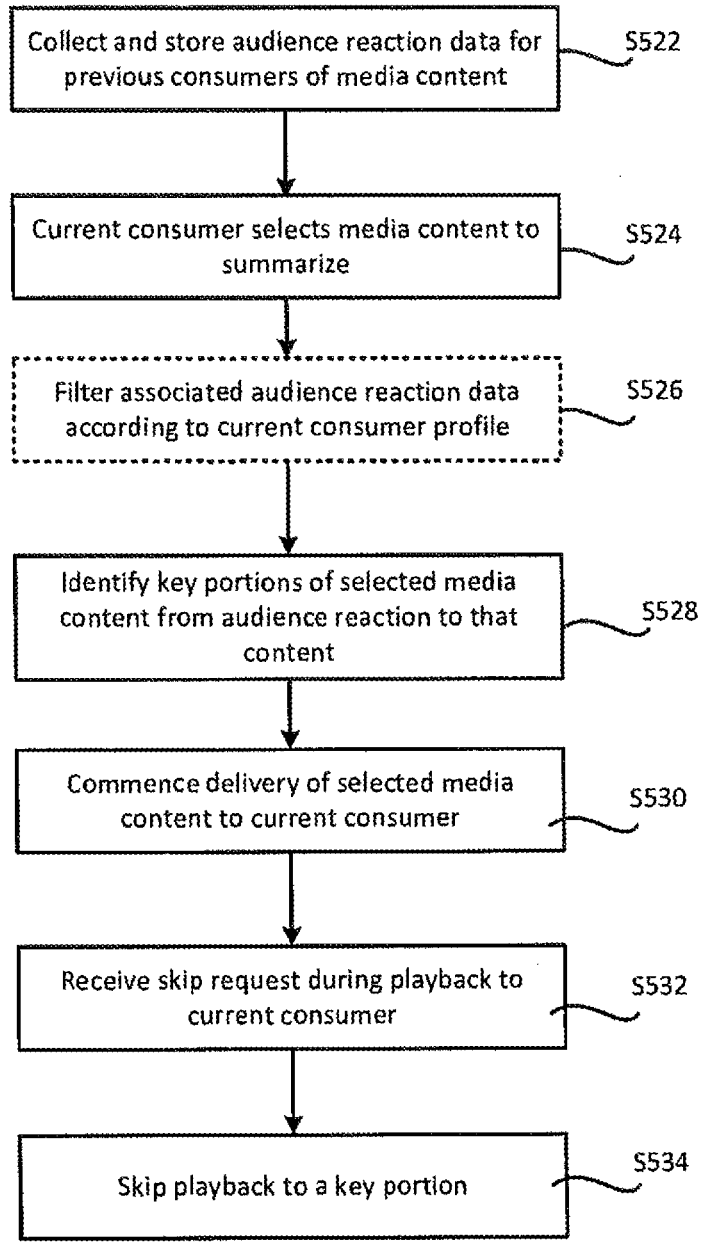

The method according to a second embodiment will now be described with reference to FIG. 5B. In the method of FIG. 5B, rather than the current content consumer prespecifying desired attribute(s) for a modified version of selected media content, the current content consumer dynamically interacts with the media content as it is delivered to the current comsumer.

While watching an item of content, the current content consumer may wish to skip ahead to the next interesting scene or clip and skip over the intervening portion of material.

The method of FIG. 5B comprises steps S522-S528 which are equivalent to steps S502-S508 of FIG. 5B.

Figure 7C:
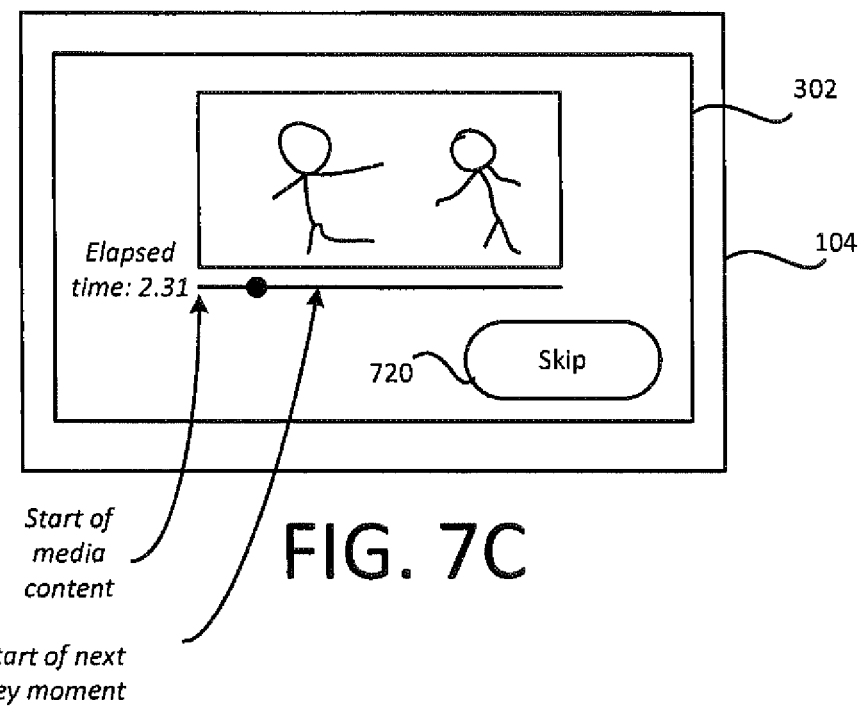
FIG. 7C is an exemplary illustration of a an application user interface operating in a playback mode.

However, at step S530 delivery (playback) of the (unmodified) selected media content to the user by the content delivery component commences e.g. that content is streamed to the current consumer 102 via the network 106. Playback is so commenced responsive to the user selecting a playback option (714 in FIG. 7B) displayed via the application user interface. Also in response to the user selection the option 712, the client user interface switches to a playback mode— illustrated in FIG. 7C—in which the streamed content is displayed.

At step S532, the current consumer 102 instigates a skip request, requesting that the delivery skip to the next identified key moment of the selected media content. That request is instigated via the application user interface by the user 102 selecting a skip option 720, and is transmitted to the server over the network 106. In some embodiments, the skip track is transmitted to the user device (see above) and the skip option 720 is selectively displayed based on the received skip track e.g. the skip track may only be displayed if the skip track indicates that a current elapsed time of the media asset delivery is not a key moment, and may optionally be displayed in conjunction with a textual "overlay" on the video which informs the user that they might wish to consider skipping ahead by an amount of time (e.g. in minutes) that would take them to the next key moment identified by the skip track relative to the current elapsed time of the delivery (or the textual overlay may be displayed as an alternative to the selectable option 720).

Responsive thereto, at step S534, the server 124 identifies the next key moment—that being the key moment after a current elapsed time of the stream and closest to the current elapsed time—and delivery of the media content skips to the start time of that key moment. That is, the server 124 commences streaming a portion of the content at the next key moment to the user by supplying extracting the portion of the media asset at the next key moment and supplying the extracted portion to the media output device of the current content consuming user via the network 106.

In each of the above-discussed scenarios, a user wants to consume video content quicker than real-time. The particular time constraint is specific to the user as are their interests—this means that even if a content owner wished to invest in the man-power to create such views manually, the sheer variety of parameters makes the task impractical.

Whilst in the above, the system 400 is implemented at the server 124, in alternative embodiments some or all of the system may be implemented at the user device 104. For instance, the user device may download and store an (original, unmodified) media asset, and the application on the user device may download (possibly pre-filtered) audience reaction data—or the aforementioned "skip track"—from the server 124 and modify the content based thereon (that is the application 105 running on the user device may be configured to implement some or all of the system 400 of FIG. 4 and the methods of FIGS. 5 and 5A, although in this case the modified version is supplied to the screen of the user device directly and may not be supplied to the network 106). That is, the user device may access the audience reaction data in computer storage of the network 106 (e.g. computer storage 206) remotely via the network 106.

Further, whilst in the above the functionality of server 124 is implemented by a single server, in alternative embodiments the same functionality may be implemented by more than one server. For instance, a first content server may comprise computer storage storing the media asset and the audience reaction data, and a second content server may comprise an access component for accessing the computer storage at the first server remotely in order to modify the remote media asset.

Further, whilst in the above the desired attribute is a timing constraint, rather than (or in addition to) a time constraint, the user may select that they want to be shown only the most interesting portions of the media content. That is, the desired attribute may be a qualitative rather than quantitative condition. In the example above, the summarization engine may generate a summary containing all of the identified key moments P-U, the summary thus having a duration of about 8 minutes.

Further, whilst in the above the media asset is a video asset (comprising video data and possibly audio data), a media asset may alternatively be an audio asset (comprising audio data but not video data) e.g. an audio asset might be an episode of a radio show, or a music track etc.

Further, whilst in the above all three of sensor data, attendance data and social data are used to modify content, in alternative embodiments only one or two of those data sets may be so used.

Further, whilst in the above a media asset is modified by editing the media asset, a media asset may be modified in one or more of a number of alternative or additional ways. For instance, a media asset may be modified by performing one or more of the following: dynamically editing, changing play rates, inserting CGI, inserting ads, controlling multiple time-synced feeds, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims While this invention has been particularly shown and described with references to example embodiments thereof, it will be understood by those skilled in the art that various changes in form and details may be made therein without departing from the scope of the invention encompassed by the appended claims.

What is claimed is:

1. A content delivery system for delivering media content to a current content consuming user, the system comprising:
   an input configured to receive from the current content consuming user selection information for selecting a media asset for delivery to a media output device of the current content consuming user and control information identifying a desired attribute of a modified version of the asset;
   computer storage configured to store the media asset and audience reaction data associated with the media asset and generated by analyzing at least a previous content consuming user's reactions to the media asset whilst the media asset was supplied to a media output device of the previous content consuming user;
   a modified version generation component configured to identify the selected media asset in the computer storage and modify the media asset based on the control information and the audience reaction data by editing the media asset based on the audience reaction data to reduce the duration of the media asset, wherein the edited version of the media asset comprises at least one portion of the media asset identified as eliciting a higher level of audience interest by the audience reaction data and omits at least one portion of the media asset identified as eliciting a lower level of audience interest by the audience reaction data; and a content delivery component configured to supply the modified version of the media asset to the media output device of the current content consuming user, the modified version exhibiting the desired attribute.

2. A content delivery system according to claim 1 further comprising a filtering component configured to receive current consumer profile information comprising personal data associated with the current content consuming user, and filter the audience reaction data based on the current consumer profile information, the modification of the media asset being based on the filtered audience reaction data.

3. A content delivery system according to claim 1 wherein the desired attribute is a timing constraint, and the media asset is edited based on the timing constraint and the audience reaction data such that the modified version of the media asset has a duration limited by the timing constraint.

4. A content delivery system according to claim 1 wherein the at least one portion identified as more interesting has a respective duration determined by the modified version generation component based on the audience reaction data, that duration being a duration over which the higher level of audience interest is substantially sustained.

5. A content delivery system according to claim 1 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

6. A content delivery system for delivering media content to a current content consuming user, the system comprising:
an input configured to receive from the current content consuming user selection information for selecting a media asset for delivery to a media output device of the current content consuming user and control information identifying a desired attribute of a modified version of the asset;
computer storage configured to store the media asset and audience reaction data associated with the media asset and generated by analyzing at least a previous content consuming user's reactions to the media asset whilst the media asset was supplied to a media output device of the previous content consuming user;
a modified version generation component configured to identify the selected media asset in the computer storage and modify the media asset based on the control information and the audience reaction data wherein the audience reaction data comprises social data generated by analyzing one or more contributions uploaded by the previous content consuming user to a social networking service during a broadcast of the media asset to correlate at least one of those contributions to the media asset; and
a content delivery component configured to supply the modified version of the media asset to the media output device of the current content consuming user, the modified version exhibiting the desired attribute.

7. A content delivery system according to claim 6 wherein said modification of the media asset by the modified version generator comprises editing the media asset based on the audience reaction data to reduce the duration of the media asset.

8. A content delivery system according to claim 7 wherein the desired attribute is a timing constraint, and the media asset is edited based on the timing constraint and the audience reaction data such that the modified version of the media asset has a duration limited by the timing constraint.

9. A content delivery system according to claim 6 further comprising a filtering component configured to receive current consumer profile information comprising personal data associated with the current content consuming user, and filter the audience reaction data based on the current consumer profile information, the modification of the media asset being based on the filtered audience reaction data.

10. A content delivery system according to claim 6 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

11. A content delivery system for delivering media content to a current content consuming user, the system comprising:
an input configured to receive from the current content consuming user selection information for selecting a media asset for delivery to a media output device of the current content consuming user and control information identifying a desired attribute of a modified version of the asset;
computer storage configured to store the media asset and audience reaction data associated with the media asset and generated by analyzing at least a previous content consuming user's reactions to the media asset whilst the media asset was supplied to a media output device of the previous content consuming user;
a modified version generation component configured to identify the selected media asset in the computer storage and modify the media asset based on the control information and the audience reaction data wherein the audience reaction data comprises attendance data generated by analyzing input signals received via an input component of the previous content consuming user's output device and instigated by the previous content consuming user to control the supply of the media asset to the previous content consuming user's output device; and
a content delivery component configured to supply the modified version of the media asset to the media output device of the current content consuming user, the modified version exhibiting the desired attribute.

12. A content delivery system according to claim 11 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

13. A content delivery system according to claim 11 further comprising a filtering component configured to receive current consumer profile information comprising personal data associated with the current content consuming user, and filter the audience reaction data based on the current consumer profile information, the modification of the media asset being based on the filtered audience reaction data.

14. A content delivery system according to claim 11 wherein said modification of the media asset by the modified version generator comprises editing the media asset based on the audience reaction data to reduce the duration of the media asset.

15. A content delivery system according to claim 14 wherein the desired attribute is a timing constraint, and the media asset is edited based on the timing constraint and the audience reaction data such that the modified version of the media asset has a duration limited by the timing constraint.

16. A content delivery system according to claim 11 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

17. A content delivery system for delivering media content to a current content consuming user, the system comprising:
an input configured to receive from the current content consuming user selection information for selecting a media asset for delivery to a media output device of the current content consuming user and control information identifying a desired attribute of a modified version of the asset;
computer storage configured to store the media asset and audience reaction data associated with the media asset and generated by analyzing at least a previous content consuming user's reactions to the media asset whilst the media asset was supplied to a media output device of the previous content consuming user;
a modified version generation component configured to identify the selected media asset in the computer storage and modify the media asset based on the control information and the audience reaction data;
a content delivery component configured to supply the modified version of the media asset to the media output device of the current content consuming user, the modified version exhibiting the desired attribute,
wherein the modified version generation component is configured to generate based on the control information and the audience reaction data media asset modification data and the modified version of the media asset is generated dynamically, based on the generated modification data, as it is supplied to the media output device of the current content consuming user,
wherein the modified version of the media asset is generated dynamically responsive to one or more received modification requests, said requests having been instigated based on the generated modification data, and
wherein said requests are instigated automatically in response to reaching a point in the media asset identified as eliciting a lower level of audience interest by the audience reaction data to skip to a point in the media asset identified as eliciting a higher level of audience interest by the audience reaction data.

18. A content delivery system according to claim 17 further comprising a filtering component configured to receive current consumer profile information comprising personal data associated with the current content consuming user, and filter the audience reaction data based on the current consumer profile information, the modification of the media asset being based on the filtered audience reaction data.

19. A content delivery system according to claim 17 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

20. A content delivery system for delivering media content to a current content consuming user, the system comprising:
an input configured to receive from the current content consuming user selection information for selecting a media asset for delivery to a media output device of the current content consuming user and control information identifying a desired attribute of a modified version of the asset;
computer storage configured to store the media asset and audience reaction data associated with the media asset and generated by analyzing at least a previous content consuming user's reactions to the media asset whilst the media asset was supplied to a media output device of the previous content consuming user;
a modified version generation component configured to identify the selected media asset in the computer storage and modify the media asset based on the control information and the audience reaction data;
a content delivery component configured to supply the modified version of the media asset to the media output device of the current content consuming user, the modified version exhibiting the desired attribute,
wherein the input is further configured to receive selection information for selecting a media asset for delivery to a media output device of the current content consuming user;
a key moment identification component configured to identify from the audience reaction data that at least one portion of the selected media asset is a key moment;
an extraction component configured to access the computer storage to identify the selected media asset and extract the identified portion of the media asset; and
the content delivery component is further configured to supply the extracted portion of the media asset to the media output device of the current content consuming user, and
wherein the portion is extracted responsive to a skip request received during a current delivery of the media asset to the media output device of the current content consuming user by the content delivery component, responsive to which the content delivery component is configured to skip the current delivery to the key moment of by supplying the extracted portion of the media asset to the media output device of the current content consuming user.

21. A content delivery system according to claim 20 wherein the skip request is instigated manually by the current content consumer.

22. A content delivery system according to claim 20 wherein the skip request is instigated automatically responsive to the current delivery reaching a point in the media asset which is not a key moment.

23. A content delivery system according to claim 20 wherein the key moment identification component is configured to identify that a plurality of portions of the media asset are key moments, and the extraction component is configured to selectively extract one or more of said portions.

24. A content delivery system according to claim 23 wherein the extraction component is configured to select the one or more portions based on a received timing constraint and extract those selected portions.

25. A content delivery system according to claim 20 wherein the selection information is for selecting part of the media asset and the desired attribute is a desired attribute of a modified version of that part of the media asset;
wherein the modified version generation component is configured to modify the selected part of the media asset based on the control information and the audience reaction data, the modified version being a modified version of the selected part of the media asset.

26. A content delivery system according to claim 20 further comprising a filtering component configured to receive current consumer profile information comprising personal data associated with the current content consuming user, and filter the audience reaction data based on the current consumer profile information, the modification of the media asset being based on the filtered audience reaction data.

27. A content delivery system according to claim 20 wherein said modification of the media asset by the modified version generator comprises editing the media asset based on the audience reaction data to reduce the duration of the media asset.

28. A content delivery system according to claim 27 wherein the desired attribute is a timing constraint, and the media asset is edited based on the timing constraint and the audience reaction data such that the modified version of the media asset has a duration limited by the timing constrain.

* * * * *

UNITED STATES PATENT AND TRADEMARK OFFICE
CERTIFICATE OF CORRECTION

PATENT NO. : 9,510,030 B2
APPLICATION NO. : 14/179704
DATED : November 29, 2016
INVENTOR(S) : Philip Antony Shaw et al.

Page 1 of 1

It is certified that error appears in the above-identified patent and that said Letters Patent is hereby corrected as shown below:

On the Title Page

On the line immediately following the (57) Abstract paragraph, delete "28 Claims, 10 Drawing Sheets" and insert --28 Claims, 9 Drawing Sheets--.

In the Drawings

Sheet 1 of 10 through Sheet 10 of 10, please remove Sheet 5 of 10 and renumber the remaining Drawing Sheets accordingly.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*